United States Patent
Hiasa et al.

(10) Patent No.: US 10,208,173 B2
(45) Date of Patent: *Feb. 19, 2019

(54) SIZING AGENT-COATED REINFORCING FIBERS, METHOD FOR PRODUCING SIZING AGENT-COATED REINFORCING FIBERS, PREPREG, AND FIBER-REINFORCED COMPOSITE MATERIAL

(71) Applicant: TORAY INDUSTRIES, INC., Tokyo (JP)

(72) Inventors: Takumi Hiasa, Ehime (JP); Daigo Kobayashi, Ehime (JP); Tomoko Ichikawa, Ehime (JP); Makoto Endo, Ehime (JP)

(73) Assignee: TORAY INDUSTRIES, INC., Tokyo (JP)

(*) Notice: Subject to any disclaimer, the term of this patent is extended or adjusted under 35 U.S.C. 154(b) by 17 days.

This patent is subject to a terminal disclaimer.

(21) Appl. No.: 15/120,708

(22) PCT Filed: Mar. 4, 2015

(86) PCT No.: PCT/JP2015/056330
§ 371 (c)(1),
(2) Date: Aug. 22, 2016

(87) PCT Pub. No.: WO2015/137206
PCT Pub. Date: Sep. 17, 2015

(65) Prior Publication Data
US 2017/0002154 A1    Jan. 5, 2017

(30) Foreign Application Priority Data
Mar. 12, 2014    (JP) .................. 2014-048509

(51) Int. Cl.
| | | |
|---|---|---|
| *C08J 5/06* | (2006.01) | |
| *C08J 5/24* | (2006.01) | |
| *D06M 13/11* | (2006.01) | |
| *D06M 13/17* | (2006.01) | |
| *D06M 15/11* | (2006.01) | |
| *D06M 15/53* | (2006.01) | |
| *D06M 15/507* | (2006.01) | |
| *D06M 101/40* | (2006.01) | |

(52) U.S. Cl.
CPC . *C08J 5/06* (2013.01); *C08J 5/24* (2013.01); *D06M 13/11* (2013.01); *D06M 13/17* (2013.01); *D06M 15/11* (2013.01); *D06M 15/507* (2013.01); *D06M 15/53* (2013.01); *C08J 2363/00* (2013.01); *C08J 2363/02* (2013.01); *C08J 2481/06* (2013.01); *C08J 2487/00* (2013.01); *D06M 2101/40* (2013.01); *D06M 2200/40* (2013.01)

(58) Field of Classification Search
CPC ... C08J 5/24; C08J 5/06; C08J 2363/00; C08J 2363/02; C08J 2481/06; C08J 2487/00; D06M 13/11; D06M 13/17; D06M 15/11; D06M 15/53; D06M 15/507; D06M 2101/40; D06M 2200/40
USPC ...................................... 523/447
See application file for complete search history.

(56) References Cited

U.S. PATENT DOCUMENTS

| | | | | |
|---|---|---|---|---|
| 3,957,716 | A | | 5/1976 | Weldy |
| 4,555,446 | A | | 11/1985 | Sumida et al. |
| 5,824,413 | A | * | 10/1998 | Schell .................. C03C 25/26 428/375 |
| 5,955,195 | A | * | 9/1999 | Moireau ............... C03C 25/36 427/175 |
| 2003/0138398 | A1 | | 7/2003 | Okumura et al. |
| 2009/0162653 | A1 | | 6/2009 | Sakata et al. |
| 2011/0262746 | A1 | | 10/2011 | Arai et al. |
| 2012/0035299 | A1 | | 2/2012 | Arai et al. |
| 2015/0224210 | A1 | | 8/2015 | Sekitani et al. |
| 2016/0340485 | A1 | | 11/2016 | Nomura et al. |

FOREIGN PATENT DOCUMENTS

| | | |
|---|---|---|
| CN | 1426424 A | 6/2003 |
| CN | 102348735 A | 2/2012 |
| CN | 106029777 A | 10/2016 |
| EP | 3112420 A1 | 1/2017 |
| JP | 57-128266 A | 8/1982 |
| JP | 57-171767 A | 10/1982 |
| JP | 62-33872 A | 2/1987 |
| JP | 2006-316089 A | 11/2006 |
| JP | 2007-92024 A | 4/2007 |
| JP | 2008-1997 A | 1/2008 |
| JP | 2010-240163 A | 10/2010 |
| JP | 2014-196382 A | 10/2014 |
| WO | WO 01/83566 A1 | 11/2001 |
| WO | WO 2007/060833 A1 | 5/2007 |
| WO | WO 2007/14678 A1 | 12/2007 |
| WO | WO 2014/030556 A1 | 2/2014 |

OTHER PUBLICATIONS

Cho et al., JP 2008-001997 A machine translation in English, Jan. 10, 2008 (Year: 2008).*
English translation of JP-57-171767-A, which was published Oct. 22, 1982.
Extended European Search Report issued in European Application No. 15760771.4 dated Aug. 25, 2017.

(Continued)

*Primary Examiner* — David T Karst
(74) *Attorney, Agent, or Firm* — Birch, Stewart, Kolasch & Birch, LLP

(57) ABSTRACT

Sizing agent-coated reinforcing fibers include reinforcing fibers and a sizing agent containing a polyrotaxane, the reinforcing fibers being coated with the sizing agent. Provided are sizing agent-coated reinforcing fibers that provide a fiber-reinforced composite material with excellent mechanical properties, a method for producing the sizing agent-coated reinforcing fibers, a prepreg including the sizing agent-coated reinforcing fibers, and a fiber-reinforced composite material with excellent mechanical properties including the sizing agent-coated reinforcing fibers.

10 Claims, No Drawings

(56) References Cited

OTHER PUBLICATIONS

International Search Report for PCT/JP2015/056330 (PCT/ISA/210) dated Jun. 9, 2015.
Written Opinion of the International Searching Authority for PCT/JP2015/056330 (PCT/ISA/237) dated Jun. 9, 2015.

* cited by examiner

SIZING AGENT-COATED REINFORCING FIBERS, METHOD FOR PRODUCING SIZING AGENT-COATED REINFORCING FIBERS, PREPREG, AND FIBER-REINFORCED COMPOSITE MATERIAL

TECHNICAL FIELD

The present invention relates to sizing agent-coated reinforcing fibers that have high adhesion to matrix resins and provides a fiber-reinforced composite material having high mechanical strength, a method for producing sizing agent-coated reinforcing fibers, a prepreg, and a fiber-reinforced composite material.

BACKGROUND ART

Fiber-reinforced composite materials, which are excellent in strength, rigidity, dimensional stability, and other properties despite their light weight, have been widely used in general industrial fields, such as office machine applications, computer-related applications (e.g., IC trays, housings of notebook computers), and automobile applications, and increasingly demanded year by year. As reinforcing fibers in these materials, metal fibers such as aluminum fibers and stainless steel fibers, organic fibers such as aramid fibers and PBO fibers, inorganic fibers such as silicon carbide fibers, carbon fibers, and other fibers have been used. In terms of the balance of specific strength, specific rigidity, and lightness, carbon fibers are suitable, and in particular, polyacrylonitrile-based carbon fibers have been advantageously used.

As sizing agents for application to these reinforcing fibers, resins such as phenolic resins, melamine resins, bismaleimide resins, unsaturated polyester resins, and epoxy resin, have been advantageously used. In general, molded articles of fiber-reinforced composite materials made of reinforcing fibers and a matrix resin require high interfacial adhesion between the reinforcing fibers and the matrix resin in order to achieve high tensile strength and compression strength in the fiber direction. Thus, as sizing agents for application to reinforcing fibers, epoxy resins have been particularly advantageously used in order to improve the interfacial adhesion and provide a fiber-reinforced composite material having high mechanical strength. For example, there are proposed methods including applying a sizing agent of bisphenol A diglycidyl ether to carbon fibers (Patent Documents 1 and 2). In addition, there are proposed methods including applying a sizing agent of an epoxy adduct of polyalkylene glycol to carbon fibers (Patent Documents 3, 4, and 5).

Fiber-reinforced composite materials are ununiform materials and thus have great differences in physical properties in the direction of reinforcing fiber alignment and other directions. For example, shock resistance, indicated by resistance to falling weight impact, is known to be determined by interlaminar peel strength, i.e., $G_{Ic}$ (opening mode) and $G_{IIc}$ (in-plane shearing mode) interlaminar fracture toughnesses. In particular, carbon fiber-reinforced composite materials including a thermosetting matrix resin are brittle to stresses from directions other than the direction of carbon fiber (reinforcing fiber) alignment due to the low toughness of the matrix resin.

To solve this problem, studies have been made on sizing agents capable of improving the strength against stresses from directions other than the direction of fiber alignment as well as the tensile strength and compression strength in the fiber direction. For example, there is proposed a method of producing a carbon fiber-reinforced composite material provided with high interlaminar fracture toughness by using a sizing agent necessarily containing a flexible epoxy resin and an epoxy resin incompatible with the flexible epoxy resin (Patent Document 6).

PRIOR ART DOCUMENTS

Patent Documents

Patent Document 1: U.S. Pat. No. 3,957,716
Patent Document 2: JP 57-171767 A
Patent Document 3: JP 57-128266 A
Patent Document 4: U.S. Pat. No. 4,555,446
Patent Document 5: JP 62-33872 A
Patent Document 6: WO 07/060833

SUMMARY OF THE INVENTION

Problems to be Solved by the Invention

The above-described methods, however, are not necessarily sufficient in view of demands for further weight reduction and higher interlaminar fracture toughness, which will be stronger and stronger in the future. While the toughness and strength of matrix resins are being increased, there is a need for the development of sizing agents capable of further increasing the interlaminar fracture toughness of fiber-reinforced composite materials.

In view of the above-described problem of the related art, it is an object of the present invention to provide sizing agent-coated reinforcing fibers that provide a fiber-reinforced composite material with high toughness, a method for producing the sizing agent-coated reinforcing fibers, and a fiber-reinforced composite material including the reinforcing fibers.

Means for Solving the Problems

The inventors discovered that a fiber-reinforced composite material having improved toughness can be obtained by using reinforcing fibers coated with a sizing agent containing a polyrotaxane, thereby arriving at the present invention.

Thus, the present invention is sizing agent-coated reinforcing fibers including reinforcing fibers and a sizing agent containing a polyrotaxane, the reinforcing fibers being coated with the sizing agent. As used herein, the term "polyrotaxane" refers to a compound having cyclic molecules, a linear molecule included in the cyclic molecules such that the linear molecule is threaded through the cyclic molecules, and stopper groups disposed at both ends of the linear molecule so as to prevent the cyclic molecules from separating from the linear molecule.

The present invention also includes a method for producing sizing agent-coated reinforcing fibers, the method including, in sequence, applying a sizing agent containing a polyrotaxane to reinforcing fibers, and heat-treating the reinforcing fibers, wherein in the step of applying the sizing agent, the sizing agent is adhered in an amount of 0.1 to 10 parts by mass based on 100 parts by mass of the sizing agent-coated reinforcing fibers, and the step of heat-treating the reinforcing fibers is carried out at a temperature in a range of 160° C. to 260° C. for 30 to 600 seconds.

The present invention also includes a prepreg including the sizing agent-coated reinforcing fibers described above and a thermosetting resin.

The present invention also includes a fiber-reinforced composite material obtained by curing the prepreg described above.

The present invention also includes a fiber-reinforced composite material including the sizing agent-coated reinforcing fibers described above and a thermosetting resin.

Effects of the Invention

By using the sizing agent-coated reinforcing fibers of the present invention, fiber-reinforced composite materials having high toughness can be produced.

MODE FOR CARRYING OUT THE INVENTION

Embodiments of the present invention will be described below.

The present invention is sizing agent-coated reinforcing fibers including reinforcing fibers and a sizing agent containing a polyrotaxane, the reinforcing fibers being coated with the sizing agent.

A description will be given first of the sizing agent for use in the present invention.

The sizing agent for use in the present invention must contain a polyrotaxane. Polyrotaxanes are compounds made up of a pseudopolyrotaxane, which is made up of cyclic molecules including a linear molecule such that the linear molecule is threaded through the openings of the cyclic molecules, and stopper groups disposed at both ends of the pseudopolyrotaxane so as to prevent separation of the cyclic molecules. Polyrotaxanes have unique functions and characteristics, and thus studies have recently been carried out into the application to various technical fields. For example, JP 2008-1997 A has proposed a technique for improving stretchability, washing resistance, crease resistance, and other properties of fiber materials using a polyrotaxane material.

The inventors discovered that high elasticity and high toughness can be imparted to a reinforcing fiber/matrix resin interface by applying a sizing agent containing a polyrotaxane to reinforcing fibers, whereby a fiber-reinforced composite material having high interlaminar fracture toughness can be provided. Components of a polyrotaxane in the sizing agent of the present invention will be described below.

Cyclic Molecule

Cyclic molecules for use in a polyrotaxane may be any molecules that can include a linear molecule such that the linear molecule is threaded through their openings.

The cyclic molecule is preferably a cyclic molecule having a hydroxyl group, more preferably cyclodextrin in terms of inclusion properties and productivity. The cyclodextrin may be a cyclodextrin derivative. Any type of cyclodextrin or cyclodextrin derivative may be used, but preferred are those selected from α-cyclodextrin, β-cyclodextrin, γ-cyclodextrin, and derivatives thereof. Cyclodextrin derivatives are compounds obtained by substituting hydroxyl groups of cyclodextrin with polymer chains and/or substituents. By appropriately selecting a polymer chain and/or substituent according to other components in the sizing agent and a solvent for dissolving the sizing agent, dispersibility of polyrotaxane in the sizing agent can be controlled. Examples of the polymer chain include polyethylene glycol, polypropylene glycol, polyethylene, polypropylene, polyvinyl alcohol, polyacrylate, polylactone, and polylactam. Examples of the substituent include hydroxyl; thionyl; amino; sulfonyl; phosphonyl; acetyl; alkyl groups such as methyl, ethyl, propyl, and isopropyl; trityl; tosyl; trimethylsilane; and phenyl. In general, when the other components in the sizing agent or the solvent for dissolving the sizing agent is a hydrophilic compound, it is preferable to introduce a hydrophilic polymer chain or substituent. When the other components in the sizing agent or the solvent for dissolving the sizing agent is a hydrophobic compound, it is preferable to introduce a hydrophobic polymer chain or substituent. Introducing a polymer chain or substituent improves the affinity of polyrotaxane for the sizing agent, provides high dispersibility in the sizing agent, and provides strong adhesion between the sizing agent and a reinforcing fiber surface.

From such a standpoint, it is more preferred that the above-described cyclodextrin be modified with a polymer chain. The polymer chain preferably contains a bond selected from —O— bond and —NH— bond and a group selected from alkylene and alkenylene. The alkylene group has preferably 1 to 20 carbon atoms, more preferably 2 to 12 carbon atoms. The alkenylene group has preferably 2 to 20 carbon atoms, more preferably 2 to 12 carbon atoms. Examples of such polymer chains include polyalkylene glycol, polyalkenylene glycol, polyalkyleneimine, polylactone, and polylactam. Specific preferred examples include polyethylene glycol, polypropylene glycol, polyethyleneimine, poly-β-propiolactone, poly-δ-valerolactone, poly-ε-caprolactone, poly-ε-caprolactam, and polylauryllactam. Some of hydrogen atoms in the alkylene or alkenylene group may be substituted with at least one selected from the group consisting of hydroxyl; carboxyl; acyl groups such as acetyl; phenyl; halogen atoms; and olefin groups such as allyl.

More specific examples of such cyclodextrin or cyclodextrin derivatives include α-cyclodextrin (the number of glucose residues=6, inner diameter of opening=about 0.45 to 0.6 μm), β-cyclodextrin (the number of glucose residues=7, inner diameter of opening=about 0.6 to 0.8 μm), γ-cyclodextrin (the number of glucose residues=8, inner diameter of opening=about 0.8 to 0.95 μm), dimethyl cyclodextrin, glucosyl cyclodextrin, 2-hydroxypropyl-α-cyclodextrin, 2,6-di-O-methyl-α-cyclodextrin 6-O-α-maltosyl-α-cyclodextrin, 6-O-α-D-glucosyl-α-cyclodextrin, hexakis(2,3,6-tri-O-acetyl)-α-cyclodextrin, hexakis(2,3,6-tri-O-methyl)-α-cyclodextrin, hexakis(6-O-tosyl)-α-cyclodextrin, hexakis(6-amino-6-deoxy)-α-cyclodextrin, hexakis(2,3-acetyl-6-bromo-6-deoxy)-α-cyclodextrin, hexakis(2,3,6-tri-O-octyl)-α-cyclodextrin, mono(2-O-phosphoryl)-α-cyclodextrin, mono[2,(3)-O-(carboxylmethyl)]-α-cyclodextrin, octakis(6-O-t-butyldimethylsilyl)-α-cyclodextrin, succinyl-α-cyclodextrin, glucuronyl glucosyl-β-cyclodextrin, heptakis(2,6-di-O-methyl)-β-cyclodextrin, heptakis(2,6-di-O-ethyl)-β-cyclodextrin, heptakis(6-O-sulfo)-β-cyclodextrin, heptakis(2,3-di-O-acetyl-6-O-sulfo)β-cyclodextrin, heptakis(2,3-di-O-methyl-6-O-sulfo)-β-cyclodextrin, heptakis(2,3,6-tri-O-acetyl)-β-cyclodextrin, heptakis(2,3,6-tri-O-benzoyl)-β-cyclodextrin, heptakis(2,3,6-tri-O-methyl)β-cyclodextrin, heptakis(3-O-acetyl-2,6-di-O-methyl)-β-cyclodextrin, heptakis(2,3-O-acetyl-6-bromo-6-deoxy)-β-cyclodextrin, 2-hydroxyethyl-β-cyclodextrin, hydroxypropyl-β-cyclodextrin, 2-hydroxypropyl-β-cyclodextrin, (2-hydroxy-3-N,N,N-trimethylamino)propyl-β-cyclodextrin, 6-O-α-maltosyl-β-cyclodextrin, methyl-β-cyclodextrin, hexakis(6-amino-6-deoxy)-β-cyclodextrin, bis(6-azido-6-deoxy)-β-cyclodextrin, mono(2-O-phosphoryl)-β-cyclodextrin, hexakis[6-deoxy-6-(1-imidazolyl)]-β-cyclodextrin, monoacetyl-β-cyclodextrin, triacetyl-β-cyclodextrin, monochlorotriazinyl-β-cyclodextrin, 6-O-α-D-glucosyl-β-cyclodextrin, 6-O-α-D-maltosyl-β-cyclodextrin, succinyl-β-cyclodextrin, succinyl-(2-hydroxypropyl)β-cyclodextrin, 2-carboxymethyl-β-cyclodextrin, 2-carboxyethyl-β-cyclodextrin, butyl-β-cyclodextrin, sulfopropyl-β-cyclodextrin, 6-monodeoxy-6-monoamino-β-cyclodextrin, silyl[(6-O-t-butyldimethyl)2,3-di-O-acetyl]-β-cyclodextrin, 2-hydroxyethyl-γ-cyclodextrin, 2-hydroxypropyl-γ-cyclodextrin, butyl-γ-cyclodextrin, 3A-amino-3A-deoxy-(2AS,3AS)-γ-cyclodextrin, mono-2-O-(p-toluenesulfonyl)-γ-cyclodextrin, mono-6-O-(p-toluenesulfonyl)-γ-cyclodextrin, mono-6-O-mesitylenesulfonyl-γ-cyclodextrin, octakis(2,3,6-tri-O-methyl)-γ-cyclodextrin, octakis(2,6-di-O-phenyl)-γ-cyclodextrin, octakis(6-O-t-butyldimethylsilyl)-γ-cyclodextrin, and octakis(2,3,6-tri-O-acetyl)-γ-cyclodextrin. The cyclic molecules, such as the cyclodextrins listed above, can be used alone or in combination of two or more.

Linear Molecule

The linear molecule in a polyrotaxane may be any molecule that can be included in cyclic molecules such that the linear molecule is threaded through the openings of the cyclic molecules.

Examples of the linear molecule include polyvinyl alcohol, polyvinylpyrrolidone, poly(meth)acrylic acid, cellulose resins (e.g., carboxymethylcellulose, hydroxyethylcellulose, and hydroxypropylcellulose), polyacrylamide, polyethylene glycol, polypropylene glycol, polyvinyl acetal resins, polyvinyl methyl ether, polyamine, polyethyleneimine, casein, gelatin, starch, and copolymers thereof; polyolefin resins such as polyethylene and polypropylene; polyester resins; polyvinyl chloride resins; polystyrene resins such as polystyrene and acrylonitrile-styrene copolymer resins; acrylic resins such as polymethyl methacrylate, (meth)acrylate copolymers, and acrylonitrile-methyl acrylate copolymer resins; polycarbonate resins; polyurethane resins; vinyl chloride-vinyl acetate copolymer resins; polyvinyl butyral resins; polyisobutylene; polytetrahydrofuran; polyaniline; acrylonitrile-butadiene-styrene copolymers (ABS resins); polyamides such as nylon; polyimides; polydienes such as polyisoprene and polybutadiene; polysiloxanes such as polydimethylsiloxane; polysulfones; polyimines; polyacetic anhydrides; polyureas; polysulfides; polyphosphazenes; polyketones; polyphenylenes; polyhaloolefins; and derivatives of these resins. In terms of high dispersibility in sizing agent and productivity, preferred are linear molecules selected from the group consisting of polyethylene glycol, polyisoprene, polyisobutylene, polybutadiene, polypropylene glycol, polytetrahydrofuran, polydimethylsiloxane, polyethylene, polypropylene, polyvinyl alcohol, and polyvinyl methyl ether, and particularly preferred is polyethylene glycol.

The weight average molecular weight of the linear molecule in a polyrotaxane is preferably 15,000 or more, more preferably 17,000 or more. The weight average molecular weight is preferably 30,000 or less, more preferably 25,000 or less. The weight average molecular weight can be determined by converting a retention time (retention volume) determined using gel permeation chromatography (GPC) into a polystyrene molecular weight based on the retention time (retention volume) of a standard polystyrene of known molecular weight determined under the same conditions. When the weight average molecular weight of the linear molecule is 15,000 or more, a particularly strong slide-ring effect of polyrotaxane, which is due to sliding of cyclic molecules on the linear molecule, is produced, and a fiber-reinforced composite material made of a matrix resin and sizing-coated reinforcing fibers containing the linear molecule will have particularly improved physical properties. When the weight average molecular weight of the linear molecule is 30,000 or less, the polyrotaxane properly interacts with a matrix resin, resulting in a fiber-reinforced composite material having particularly improved physical properties.

Amount of Inclusion

In the case where a plurality of cyclic molecules include a linear molecule such that the linear molecule is threaded through the cyclic molecules, when the maximum amount of inclusion of one linear molecule in the cyclic molecules is 1, the cyclic molecules preferably include the linear molecule in an amount ranging from 0.001 to 0.6, more preferably 0.01 to 0.5, and still more preferably 0.05 to 0.4.

The maximum amount of inclusion in the cyclic molecules can be calculated from the length of the linear molecule and the thickness of the cyclic molecules. For example, when the linear molecule is polyethylene glycol and the cyclic molecules are α-cyclodextrin molecules, its maximum amount of inclusion has been experimentally determined (see Macromolecules 1993, 26, 5698-5703, which is hereby incorporated herein in its entirety).

Stopper Group

The stopper groups in a polyrotaxane may be any groups that are disposed at both ends of a linear molecule and act to prevent separation of cyclic molecules.

Examples of preferred stopper groups include groups selected from the group consisting of dinitrophenyl groups, cyclodextrins, adamantane groups, trityl groups, fluoresceins, pyrenes, substituted benzenes, optionally substituted polynuclear aromatics, and steroids. Examples of substituents include, but are not limited to, alkyl groups such as methyl, alkyloxy groups such as methoxy, and hydroxy, halogen, cyano, sulfonyl, carboxyl, amino, and phenyl groups. One or more substituents may be present. The stopper groups are more preferably groups selected from the group consisting of dinitrophenyl groups, cyclodextrins, adamantane groups, trityl groups, fluoresceins, and pyrenes, still more preferably adamantane groups or trityl groups.

Of the polyrotaxanes described above, polyrotaxanes made of cyclic molecules of an α-cyclodextrin derivative having a polymer chain including ε-caprolactone monomer units and a linear molecule of polyethylene glycol are particularly preferred in terms of high dispersibility in sizing agent and industrial productivity. Specific examples of products of such compounds include "SeRM (registered trademark)" Super Polymer SH1310P, "SeRM (registered trademark)" Super Polymer SH2400P, and "SeRM (registered trademark)" Super Polymer SH3400P (all available from Advanced Softmaterials Inc). In particular, for example, "SeRM (registered trademark)" Super Polymer SH2400P, which includes a linear molecule of polyethylene glycol having a weight average molecular weight of 20,000, is suitable for use.

The sizing agent may contain, in addition to the polyrotaxane, a compound that promotes cross-linking between molecules of the polyrotaxane. Examples of the compound that promotes cross-linking includes compounds having a plurality of reactive groups that react with active groups of cyclic molecules in the polyrotaxane. Specifically, cross-linking occurs in such a manner that the plurality of reactive groups each react with the plurality of active groups in the polyrotaxane to form chemical bonds.

Examples of the above-described reactive group include isocyanate, thioisocyanate, oxirane, oxetane, carbodiimide, silanol, oxazoline, and aziridine groups. More preferred is an isocyanate group or a thioisocyanate group, and still more preferred is an isocyanate group.

More specific examples of the above-described compound having a plurality of reactive groups include polyether, polyester, polysiloxane, polycarbonate, poly(meth)acrylate, polyene, copolymers thereof, and mixtures thereof with their both ends modified with the reactive groups described above.

Products containing a polyrotaxane and a compound that promotes cross-linking are also commercially available. Specific examples of such products include "SeRM (registered trademark)" elastomer SH3400S, "SeRM (registered trademark)" elastomer SH3400M, and "SeRM (registered trademark)" elastomer SH3400H (all available from Advanced Softmaterials Inc).

Preferably, the sizing agent further contains, in addition to the polyrotaxane, a compound having at least one epoxy group. Epoxy groups interact with functional groups on the surface of reinforcing fibers to improve the adhesion to the reinforcing fiber surface and also are highly interactive and reactive with matrix resins, in particular, epoxy resins. With these features, fiber-reinforced composite materials having high interlaminar fracture toughness and excellent in adhesion between reinforcing fibers and a matrix resin can be obtained.

The compound having at least one epoxy group may be an aliphatic epoxy compound or an aromatic epoxy compound. These compounds can be used alone or in combination of two or more. Specific examples of the compound having at least one epoxy group include glycidyl ether epoxy compounds derived from polyols, glycidyl amine epoxy compounds derived from amines having two or more active hydrogens, glycidyl ester epoxy compounds derived from polycarboxylic acids, and epoxy compounds produced by oxidizing compounds having two or more double bonds in their molecules.

Examples of glycidyl ether epoxy compounds include glycidyl ether epoxy compounds produced by the reaction between epichlorohydrin and bisphenol A, bisphenol F, bisphenol AD, bisphenol S, tetrabromobisphenol A, phenol novolac, cresol novolac, hydroquinone, resorcinol, 4,4'-dihydroxy-3,3',5,5'-tetramethylbiphenyl, 1,6-dihydroxynaphtalene, 9,9-bis(4-hydroxyphenyl)fluorene, tris(p-hydroxyphenyl)methane, and tetrakis(p-hydroxyphenyl)ethane. Other examples include glycidyl ether epoxy compounds produced by the reaction between epichlorohydrin and ethylene glycol, diethylene glycol, triethylene glycol, tetraethylene glycol, polyethylene glycol, propylene glycol, dipropylene glycol, tripropylene glycol, tetrapropylene glycol, polypropylene glycol, trimethylene glycol, polybutylene glycol, 1,2-butanediol, 1,3-butanediol, 1,4-butanediol, 2,3-butanediol, 1,5-pentanediol, neopentyl glycol, 1,6-hexanediol, 1,4-cyclohexanedimethanol, hydrogenated bisphenol A, hydrogenated bisphenol F, glycerol, diglycerol, polyglycerol, trimethylolpropane, pentaerythritol, sorbitol, and arabitol. Further examples of the epoxy compound of this type include glycidyl ether epoxy compounds having dicyclopentadiene backbones and glycidyl ether epoxy compounds having biphenyl aralkyl backbones.

Examples of glycidyl amine epoxy compounds include N,N-diglycidylaniline, N,N-diglycidyl-o-toluidine, 1,3-bis(aminomethyl)cyclohexane, m-xylenediamine, m-phenylenediamine, 4,4'-diaminodiphenylmethane, and 9,9-bis(4-aminophenyl)fluorene. Other examples include epoxy compounds produced by reacting epichlorohydrin with both the hydroxyl group and the amino group of an aminophenol, such as m-aminophenol, p-aminophenol, and 4-amino-3-methylphenol.

Examples of glycidyl ester epoxy compounds include glycidyl ester epoxy compounds produced by reacting epichlorohydrin with phthalic acid, terephthalic acid, hexahydrophthalic acid, and dimer acid.

Examples of epoxy compounds produced by oxidizing compounds having two or more double bonds in their molecules include epoxy compounds each having an epoxycyclohexane ring in their molecules and epoxidized soybean oil.

In addition to these epoxy compounds, epoxy compounds such as triglycidyl isocyanurate may be used. Furthermore, epoxy compounds synthesized using the above-listed epoxy compounds as starting materials, e.g., epoxy compounds synthesized by oxazolidone ring formation reaction of bisphenol A diglycidyl ether and tolylene diisocyanate may be used.

Furthermore, epoxy compounds having at least one epoxy group and at least one functional group selected from amide, imide, urethane, urea, sulfonyl, and sulfo groups may be used.

Examples of the compound having at least one epoxy group and at least one amide group include glycidylbenzamide and amide-modified epoxy compounds. Amide-modified epoxy compounds can be produced by reacting carboxyl groups of a dicarboxylic acid amide with epoxy groups of an epoxy compound having two or more epoxy groups.

Examples of the compound having at least one epoxy group and at least one imide group include glycidyl phthalimide, specifically, "Denacol (registered trademark)" EX-731 (Nagase ChemteX Corporation).

Examples of the compound having at least one epoxy group and at least one urethane group include urethane-modified epoxy compounds, specifically, "Adeka Resin (registered trademark)" EPU-78-13S, EPU-6, EPU-11, EPU-15, EPU-16A, EPU-16N, EAU-17T-6, EPU-1348, and EPU-1395 (ADEKA Corporation). In addition, compounds may be used that are produced by reacting the terminal hydroxyl group of a polyethylene oxide monoalkyl ether with a polyisocyanate compound in an amount equivalent to that of the hydroxyl group, and then reacting the isocyanate residue of the resulting reaction product with a hydroxyl group of a polyepoxy compound. Examples of the polyisocyanate compound used in this reaction include 2,4-tolylene diisocyanate, m-phenylene diisocyanate, p-phenylene diisocyanate, diphenylmethane diisocyanate, hexamethylene diisocyanate, isophorone diisocyanate, norbornane diisocyanate, triphenylmethane tri isocyanate, and biphenyl-2,4,4'-triisocyanate.

Examples of the compound having at least one epoxy group and at least one urea group include urea-modified epoxy compounds. Urea-modified epoxy compounds can be produced by reacting carboxyl groups of a dicarboxylic acid urea with epoxy groups of an epoxy compound having two or more epoxy groups.

Examples of the compound having at least one epoxy group and at least one sulfonyl group include bisphenol S epoxy compounds.

Examples of the compound having at least one epoxy group and at least one sulfo group include p-toluenesulfonic acid glycidyl compounds and 3-nitrobenzenesulfonic acid glycidyl compounds.

The epoxy content of the compound having at least one epoxy group is preferably 2.0 meq/g or more. An epoxy compound having an epoxy content of 2.0 meq/g or more provides a high-density interaction with carbon fibers, leading to further improved adhesion between carbon fibers and a matrix resin. Although there is no upper limit to the epoxy content, an epoxy content of 8.0 meq/g will suffice in terms of adhesion because such an epoxy content enhances the interaction with reinforcing fibers. The epoxy content of the epoxy compound is more preferably 3.0 to 7.0 meq/g.

Among the above-described compounds having at least one epoxy group, compounds having two or more epoxy groups in their molecules and selected from polyether polyepoxy compounds and polyol polyepoxy compounds are preferred in terms of high adhesion. As the number of epoxy groups increases, the interaction with functional groups on a reinforcing fiber surface is enhanced, leading to further improved adhesion. Furthermore, due to having a group selected from a hydroxyl group and an ether bond in a molecule, the interaction with functional groups on a reinforcing fiber surface is enhanced, leading to a fiber-reinforced composite material having improved physical properties. Although there is no upper limit to the number of epoxy groups, ten epoxy groups will suffice in terms of adhesion.

The compound having at least one epoxy group is more preferably a glycidyl ether epoxy compound produced by the reaction between epichlorohydrin and at least one compound selected from glycerol, diglycerol, polyglycerol, trimethylolpropane, pentaerythritol, sorbitol, and arabitol. Such a compound has a flexible molecular chain and thus provides a further enhanced interaction with functional groups on a reinforcing fiber surface, leading to a fiber-reinforced composite material having further improved physical properties.

Specific examples of products of such a compound include polyglycerol polyglycidyl ethers (e.g., "Denacol (registered trademark)" EX-512 and EX-521 available from Nagase ChemteX Corporation), trimethylolpropane polyglycidyl ethers (e.g., "Denacol (registered trademark)" EX-321 available from Nagase ChemteX Corporation), glycerol polyglycidyl ethers (e.g., "Denacol (registered trademark)" EX-313 and EX-314 available from Nagase ChemteX Corporation), sorbitol polyglycidyl ethers (e.g., "Denacol (registered trademark)" EX-611, EX-612, EX-614, EX-614B, and EX-622 available from Nagase ChemteX Corporation), and pentaerythritol polyglycidyl ethers (e.g., "Denacol (registered trademark)" EX-411 available from Nagase ChemteX Corporation). These compounds can be used alone or in combination of two or more.

The amount of polyrotaxane in the sizing agent is preferably 5% by mass or more, more preferably 10% by mass or more, and still more preferably 15% by mass or more, based on the total amount of sizing agent. A polyrotaxane in an amount of 5% by mass or more provides a fiber-reinforced composite material that more effectively exhibits high elasticity and high toughness, which are the physical properties of polyrotaxane. The amount of polyrotaxane is preferably 80% by mass or less, more preferably 50% by mass or less, and still more preferably 40% by mass or less, based on the total amount of sizing agent. A polyrotaxane in an amount of 80% by mass or less tends to provide a fiber-reinforced composite material having higher tensile strength because the plasticity of the polyrotaxane properly acts on a matrix resin.

The amount of compound having at least one epoxy group in the sizing agent is preferably 20% by mass or more, more preferably 50% by mass or more, and still more preferably 60% by mass or more, based on the total amount of sizing agent. The amount of compound having at least one epoxy group in the sizing agent is preferably 95% by mass or less, more preferably 90% by mass or less, and still more preferably 85% by mass or less, based on the total amount of sizing agent.

The amounts of polyrotaxane and compound having at least one epoxy group in the sizing agent can be determined by immersing sizing agent-coated reinforcing fibers in a solvent, performing ultrasonic cleaning to elute the polyrotaxane and the compound having at least one epoxy group, and quantifying the polyrotaxane and the compound having at least one epoxy group that have been eluted. Examples of suitable solvents include acetone, N,N-dimethylformamide, acetonitrile, dichloromethane, chloroform, and mixed solutions thereof. The quantification of the polyrotaxane and the compound having at least one epoxy group can be carried out by gas chromatography, liquid chromatography, nuclear magnetic resonance spectroscopy (NMR), redox titration, acid-base titration, or other methods.

The sizing agent may also contain other components than those mentioned above. For example, auxiliary components can be added, such as adhesion-improving components that improve the adhesion of the sizing agent to reinforcing fibers and/or a matrix resin, and dispersants and surfactants for stabilizing the sizing agent.

Examples of adhesion-improving components include tertiary amine compounds such as triisopropylamine, dibutylethanolamine, diethylethanolamine, triisopropanolamine, diisopropylethylamine, N-benzylimidazole, 1,8-diazabicyclo[5,4,0]-7-undecene (DBU), 1,5-diazabicyclo[4,3,0]-5-nonene (DBN), 1,4-diazabicyclo[2,2,2]octane, and 5,6-dibutylamino-1,8-diazabicyclo[5,4,0]undecene-7 (DBA), and salts thereof; and phosphine compounds such as tributylphosphine and triphenylphosphine, and quaternary phosphonium salts. These compounds are preferably added in an amount of 1% to 25% by mass, more preferably 2% to 8% by mass, based on the total amount of sizing agent.

Examples of dispersants and surfactants include nonionic, cationic, and anionic surfactants, and in terms of stability in the form of aqueous emulsion, it is preferable to use nonionic surfactants. More specific examples include polyoxyethylene alkyl ethers, polyoxyethylene alkylphenyl ethers, polyoxyethylene fatty acid esters, polyoxyethylene fatty acid amide ethers, polyhydric alcohol fatty acid esters, polyoxyethylene polyhydric alcohol fatty acid esters, fatty acid sucrose esters, alkylol amides, and polyoxyalkylene block copolymers. Additional additives such as polyester compounds and unsaturated polyester compounds may optionally be added to the extent that the effects of the present invention are not adversely affected.

In addition, additives for imparting bundling properties or flexibility to sizing agent-coated reinforcing fibers may optionally be added to the extent that the effects of the present invention are not adversely affected. These additives can increase handleability, abrasion resistance, and fuzz resistance of sizing agent-coated reinforcing fibers and improve the impregnation properties of a matrix resin.

Examples of reinforcing fibers include, but are not limited to, inorganic fibers such as carbon fibers, glass fibers, ceramic fibers, and silicon carbide fibers; and organic fibers such as aromatic polyamide fibers (aramid fibers), polyethylene fibers, polyethylene terephthalate fibers, polybutylene terephthalate fibers, polyethylene naphthalate fibers, polyarylate fibers, polyacetal fibers, PBO fibers, polyphenylene sulfide fibers, and polyketone fibers. Of these, preferred are inorganic fibers such as carbon fibers and glass fibers, and aromatic polyamide fibers, and more preferred are carbon fibers. In particular, polyacrylonitrile-based carbon fibers, which have high specific strength and specific modulus and provide light and high-strength fiber-reinforced composite materials, are preferred.

A description will now be given of a method for producing polyacrylonitrile-based carbon fibers.

To produce a precursor of carbon fibers, spinning methods such as wet spinning, dry spinning, and dry-wet spinning can be used. To readily produce high-strength carbon fibers, wet spinning or dry-wet spinning is suitable for use.

The total fineness of carbon fibers is preferably 400 to 3,000 tex. The number of filaments of carbon fibers is preferably 1,000 to 100,000, more preferably 3,000 to 50,000. To provide further improved adhesion between carbon fibers and a matrix resin, it is preferable to apply the sizing agent described above to carbon fibers having a surface roughness (Ra) of 6.0 to 100 nm. To produce the carbon fibers having a surface roughness (Ra) of 6.0 to 100 nm, it is preferable to spin precursor fibers by wet spinning.

In wet spinning, a solution of polyacrylonitrile homopolymer or copolymer in a solvent can be used as a spinning solution. Examples of the solvent include organic solvents such as dimethyl sulfoxide, dimethylformamide, and dimethylacetamide; and aqueous solutions of inorganic compounds such as nitric acid, sodium rhodanate, zinc chloride, and sodium thiocyanate. Dimethyl sulfoxide or dimethylacetamide is suitable as a solvent.

The spinning solution as described above is spun through a spinneret into a spinning bath, where the spun product is solidified. The spinning bath may be an aqueous solution of the solvent used as a solvent for the spinning solution. Spinning liquid containing the same solvent as the solvent for the spinning solution is preferred, and aqueous dimethyl sulfoxide solution or aqueous dimethylacetamide solution is suitable. The fibers solidified in the spinning bath are washed with water and stretched to give precursor fibers. The precursor fibers are subjected to a flame-resistant treatment and a carbonization treatment, and, if necessary, further subjected to a graphitization treatment to produce carbon fibers. The carbonization treatment and the graphitization treatment are preferably carried out under the conditions of a maximum heating temperature of 1,100° C. or higher, more preferably 1,300° C. to 3,000° C.

To produce carbon fibers having high strength and modulus, carbon fibers having a smaller fineness are suitable for use. Specifically, the single fiber diameter of the carbon fibers is preferably 7.5 µm or less, more preferably 6 µm or less, and still more preferably 5.5 µm or less. The lower limit of the single fiber diameter is preferably, but not necessarily, not less than 4.5 µm. A single fiber diameter of less than 4.5 µm is likely to result in single fiber breakage during processes, which may lead to reduced productivity.

The carbon fibers, to improve their adhesion to a matrix resin, are typically subjected to an oxidation treatment to introduce oxygen-containing functional groups onto the surface. The oxidation treatment includes gas-phase oxidation, liquid-phase oxidation, and liquid-phase electrolytic oxidation. Liquid-phase electrolytic oxidation is suitable for use in terms of high productivity and uniform treatment.

Examples of electrolyte solutions used in the liquid-phase electrolytic oxidation include acidic electrolyte solutions and alkaline electrolyte solutions. Examples of acidic electrolyte solutions include inorganic acids such as sulfuric acid, nitric acid, hydrochloric acid, phosphoric acid, boric acid, and carbonic acid; organic acids such as acetic acid, butyric acid, oxalic acid, acrylic acid, and maleic acid; and salts such as ammonium sulfate and ammonium hydrogen sulfate. Of these, sulfuric acid and nitric acid, which are strongly acidic, are suitable for use. Specific examples of alkaline electrolyte solutions include aqueous solutions of hydroxides such as sodium hydroxide, potassium hydroxide, magnesium hydroxide, calcium hydroxide, and barium hydroxide; aqueous solutions of carbonates such as sodium carbonate, potassium carbonate, magnesium carbonate, calcium carbonate, barium carbonate, and ammonium carbonate; aqueous solutions of hydrogen carbonates such as sodium hydrogen carbonate, potassium hydrogen carbonate, magnesium hydrogen carbonate, calcium hydrogen carbonate, barium hydrogen carbonate, and ammonium hydrogen carbonate; and aqueous solutions of ammonia, tetraalkylammonium hydroxide, and hydrazine. Of these, aqueous solutions of ammonium carbonate and ammonium hydrogen carbonate, which are free from an alkali metal that may inhibit a matrix resin from being cured, and an aqueous solution of tetraalkylammonium hydroxide, which is strongly alkaline, are suitable for use.

To promote the formation of covalent bonds between sizing agent components and oxygen-containing functional groups on the carbon fiber surface to thereby provide further improved adhesion, the sizing agent is preferably applied to the carbon fibers after the carbon fibers are subjected to an electrolytic oxidation treatment using an alkaline electrolyte solution, or after the carbon fibers that have been subjected to an electrolytic oxidation treatment in an acidic aqueous solution is washed with an alkaline aqueous solution. After the carbon fibers are subjected to an electrolytic oxidation treatment, a fragile layer of an excessively oxidized fragment may be formed on the carbon fiber surface, from which portion breakage of a composite material may start. Such an excessively oxidized fragment is preferably dissolved away with an alkaline aqueous solution.

The alkaline aqueous solution used for washing preferably has a pH in the range of 7 to 14, more preferably in the range of 10 to 14. Specific examples of alkaline aqueous solutions include aqueous solutions of hydroxides such as sodium hydroxide, potassium hydroxide, magnesium hydroxide, calcium hydroxide, and barium hydroxide; aqueous solutions of carbonates such as sodium carbonate, potassium carbonate, magnesium carbonate, calcium carbonate, barium carbonate, and ammonium carbonate; aqueous solutions of hydrogen carbonates such as sodium hydrogen carbonate, potassium hydrogen carbonate, magnesium hydrogen carbonate, calcium hydrogen carbonate, barium hydrogen carbonate, and ammonium hydrogen carbonate; and aqueous solutions of ammonia, tetraalkylammonium hydroxide, and hydrazine. Of these, aqueous solutions of ammonium carbonate and ammonium hydrogen carbonate, which are free from an alkali metal that may inhibit a matrix resin from being cured, and an aqueous solution of tetraalkylammonium hydroxide, which is strongly alkaline, are suitable for use. The washing of the carbon fibers with an alkaline aqueous solution can be carried out, for example, by dipping or spraying. Of these, dipping is preferred in terms of easy washing, and the dipping is preferably carried out while the carbon fibers are excited by ultrasonic waves.

The concentration of an electrolyte solution is preferably in the range of 0.01 to 5 mol/L, more preferably in the range of 0.1 to 1 mol/L. An electrolyte solution at a concentration of 0.01 mol/L or more is advantageous in terms of operating cost because the electrolytic oxidation treatment can be carried out at a low voltage. An electrolyte solution at a concentration of 5 mol/L or less is advantageous in terms of safety.

The temperature of an electrolyte solution is preferably in the range of 10° C. to 100° C., more preferably in the range of 10° C. to 40° C. An electrolyte solution at a temperature of 10° C. or higher is advantageous in terms of operating cost because the electrolytic oxidation treatment can be carried out with improved efficiency. An electrolyte solution at a temperature of 100° C. or lower is advantageous in terms of safety.

The current density in liquid-phase electrolytic oxidation is preferably in the range of 1.5 to 1,000 A/m$^2$, more preferably in the range of 3 to 500 A/m$^2$, per square meter of surface area of carbon fibers in an electrolyte solution. A current density of 1.5 A/m$^2$ or more is advantageous in terms of operating cost because the electrolytic oxidation treatment can be carried out with improved efficiency. A current density of 1,000 A/m$^2$ or less is advantageous in terms of safety.

The quantity of electricity in the liquid-phase electrolytic oxidation treatment is preferably optimized depending on the degree of carbonization of carbon fibers. Treating carbon fibers having a higher modulus requires a larger quantity of electricity.

The carbon fibers preferably have a surface oxygen concentration (O/C), which is an atomic ratio of oxygen (O) to carbon (C) on the fiber surface determined by X-ray photoelectron spectroscopy, in the range of 0.05 to 0.50, more preferably in the range of 0.07 to 0.30, and still more preferably in the range of 0.10 to 0.30. A surface oxygen concentration (O/C) of 0.05 or more ensures oxygen-containing functional groups on the carbon fiber surface and provides strong adhesion to a matrix resin. A surface oxygen concentration (O/C) of 0.5 or less prevents or reduces the decrease in strength of the carbon fibers themselves due to oxidation.

The surface oxygen concentration of carbon fibers can be determined by X-ray photoelectron spectroscopy according to the following procedure. Dirt and dust on the surface of carbon fibers are removed with a solvent, and the carbon fibers are cut into pieces 20 mm in length. The pieces are spread on a sample holder made of copper, and then using AlK$\alpha$1,2 as an X-ray source, the inside of a sample chamber is kept at 1×10$^{-8}$ Torr. As a correction value of a peak associated with electrification during the measurement, the binding energy value of the main peak (peak top) of C1s is set to 284.6 eV. The C1s peak area can be determined by drawing a straight baseline in the range of 282 to 296 eV. The O1s peak area can be determined by drawing a straight baseline in the range of 528 to 540 eV. The surface oxygen concentration can be calculated as an atomic ratio from the ratio of the O1s peak area to the C1s peak area using an apparatus-specific sensitivity correction value.

The carbon fibers, after being subjected to a liquid-phase electrolytic oxidation treatment or washed with an alkaline aqueous solution, are preferably washed with water and dried. In this case, the carbon fibers are preferably dried at the lowest possible temperature because an excessively high drying temperature is likely to cause a thermal decomposition and elimination of functional groups at the outermost surface of the carbon fibers. Specifically, the drying temperature is preferably 250° C. or lower, more preferably 210° C. or lower. In view of drying efficiency, the drying temperature is preferably 110° C. or higher, more preferably 140° C. or higher.

In this manner, carbon fibers suitable for use can be produced.

The strand strength of the carbon fibers is preferably 3.5 GPa or more, more preferably 4 GPa or more, and still more preferably 5 GPa. The strand modulus of the carbon fibers is preferably 220 GPa or more, more preferably 240 GPa or more, and still more preferably 280 GPa or more. The strand tensile strength and the strand modulus of carbon fiber bundles can be determined by the testing method for resin-impregnated strands described in JIS-R-7608 (2004).

A description will now be given of a method for producing the sizing-coated reinforcing fibers of the present invention.

The sizing agent containing a polyrotaxane can be used diluted with a solvent. Examples of the solvent include water, methanol, ethanol, 2-propanol, acetone, methyl ethyl ketone, dimethylformamide, and dimethylacetamide. Of these, water, which is easy to handle and advantageous in terms of safety, is suitable for use. The sizing agent can also be used in the form of an aqueous emulsion with a surfactant added. Examples of suitable surfactants include, but are not limited to, nonionic surfactants such as block copolymers of ethylene oxide and propylene oxide.

A method of applying the sizing agent to reinforcing fibers will now be described. Preferably, a sizing agent-containing liquid obtained by simultaneously dissolving or dispersing a polyrotaxane and other sizing agent components is applied in one step. Alternatively, sizing agent-containing liquids obtained by separately dissolving or dispersing randomly-selected components may be applied in more than one step. In this case, the polyrotaxane and other components may be applied in any order. Although a description will be given below of a method of application used when the sizing agent dispersion contains a polyrotaxane and other components together, the same method can be used also when a sizing agent-containing liquid containing a polyrotaxane and a sizing agent-containing liquid containing other components are separately applied.

Examples of the method of application include immersing reinforcing fibers in a sizing agent-containing liquid via a roller, contacting reinforcing fibers with a roller provided with a sizing agent-containing liquid, and spraying a sizing agent-containing liquid onto reinforcing fibers. Although the sizing agent may be applied in a batch-wise manner or a continuous manner, the continuous manner, which can achieve high productivity and small unevenness, is suitable for use. In the application, it is preferable to control the concentration and temperature of a sizing agent-containing liquid, the tension of reinforcing fibers, and other conditions so that active components in the sizing agent can be uniformly adhered to the reinforcing fibers in an amount in an appropriate range. It is also preferable to excite the reinforcing fibers by ultrasonic waves during the application of the sizing agent.

The amount of adhered sizing agent is preferably in the range of 0.1 to 10 parts by mass of, more preferably in the range of 0.2 to 3 parts by mass, based on 100 parts by mass of the sizing agent-coated reinforcing fibers. An amount of adhered sizing agent of 0.1 part by mass or more enables the sizing agent-coated reinforcing fibers, when processed into a prepreg and woven, to withstand the friction with metal guides and other units through which the fibers pass, leading to reduced fuzzing. As a result, prepregs and other products produced using the reinforcing fibers have excellent quality. An amount of adhered sizing agent of 10 parts by mass or less enables a matrix resin to infiltrate into a reinforcing fibers bundle without being obstructed by a sizing agent layer around the reinforcing fibers bundle, thus providing a composite material having reduced voids and excellent in quality and mechanical properties.

It is preferred that the layer of the sizing agent applied to the reinforcing fibers, after being dried, have thicknesses in the range of 2.0 to 20 nm, and the maximum thickness not exceed twice the minimum thickness. A sizing agent layer having such uniform thicknesses stably produces a great adhesion-improving effect and, in addition, stably provides excellent high-order processability.

The reinforcing fibers, after being coated with a sizing agent-containing liquid, are heat treated to remove and dry the solvent in the sizing agent-containing liquid. This heat treatment is believed to promote the formation of covalent bonds between sizing agent components and functional groups on the reinforcing fiber surface to thereby improve the adhesion of the reinforcing fibers to a matrix resin. The heat treatment is preferably carried out at a temperature in the range of 130° C. to 260° C., more preferably in the range of 160° C. to 260° C., for 30 to 600 seconds. A heat treatment at 130° C. or higher for 30 seconds can sufficiently remove the water or organic solvent that has been used for dissolving or dispersing sizing agent components. A heat treatment at 260° C. or lower for 600 seconds is particularly advantageous in operating cost and safety.

The heat treatment can also be carried out by microwave irradiation and/or infrared irradiation. When the reinforcing fibers are heat treated by microwave irradiation and/or infrared irradiation, the reinforcing fibers, a heating target, can be heated to the desired temperature in a short time. Furthermore, microwave irradiation and/or infrared irradiation can rapidly heat the inside of the reinforcing fibers. This leads to a small temperature difference between the inner side and the outer side of a reinforcing fibers bundle, thus enabling a reduction in unevenness of adhesion of the sizing agent.

When the reinforcing fibers are carbon fibers, other methods can be used. The sizing agent can be applied to the carbon fiber surface through a liquid-phase electrolytic oxidation treatment in an electrolyte solution into which sizing agent components are added in advance, or sizing agent components can be applied to the carbon fiber surface simultaneously with washing with water in the washing step subsequent to the liquid-phase electrolytic oxidation treatment. In these cases, the amount of adhered sizing agent components can be controlled by controlling the concentration and temperature of the electrolyte solution, the tension of the carbon fibers, and other conditions.

The sizing-coated reinforcing fibers of the present invention are used, for example, in the forms of tows, woven fabrics, knitted fabrics, braids, webs, mats, and chopped fibers. In particular, in applications requiring high specific strength and specific modulus, tows made of unidirectionally aligned carbon fibers are most suitable. In addition, prepregs produced by impregnating the sizing-coated reinforcing fibers with a matrix resin are preferably used.

A description will now be given of a prepreg and a fiber-reinforced composite material according to the present invention. The sizing-coated reinforcing fibers in the present invention can be combined with a matrix resin to be used as a prepreg and a fiber-reinforced composite material.

The matrix resin of the prepreg and the fiber-reinforced composite material may be a thermosetting resin or a thermoplastic resin. Thermosetting resins are more preferred. Examples of thermosetting resins include resins such as unsaturated polyester resins, vinyl ester resins, epoxy resins, phenolic resins, melamine resins, urea resins, thermosetting polyimide resins, cyanate ester resins, and bismaleimide resin; modifications thereof; and resin blends thereof. Of these, epoxy resins, which advantageously have well-balanced mechanical properties and undergo little shrinkage upon curing, are preferred.

Preferred epoxy resins are epoxy resin compositions containing epoxy compounds and curing agents. Examples of epoxy compounds include, but are not limited to, bisphenol epoxy compounds, amine epoxy compounds, phenol novolac epoxy compounds, cresol novolac epoxy compounds, resorcinol epoxy compounds, phenol aralkyl epoxy compounds, naphthol aralkyl epoxy compounds, dicyclopentadiene epoxy compounds, epoxy compounds having a biphenyl backbone, isocyanate-modified epoxy compounds, tetraphenylethane epoxy compounds, and triphenylmethane epoxy compounds. From these, one or more epoxy compounds can be selected.

Examples of curing agents include, but are not limited to, aromatic amine curing agents, dicyanamide, and derivatives thereof. With aromatic amine curing agents, amines such as alicyclic amines, phenol compounds, acid anhydrides, polyamideaminos, organic acid hydrazides, isocyanates, and other compounds can be used in combination.

In particular, epoxy resin compositions containing a polyfunctional glycidyl amine epoxy compound and an aromatic diamine curing agent are preferred. In general, matrix resins containing a polyfunctional glycidyl amine epoxy compound and an aromatic diamine curing agent have high crosslink densities and provide fiber-reinforced composite materials with improved heat resistance and compression strength.

Examples of polyfunctional glycidyl amine epoxy compounds suitable for use include tetraglycidyl diaminodiphenylmethane, triglycidyl aminophenol, and triglycidyl aminocresol. Polyfunctional glycidyl amine epoxy compounds increase heat resistance and are preferably contained in an amount of 30% to 100% by mass based on 100% by mass of the total epoxy compounds. A glycidyl amine epoxy compound in an amount of 30% by mass or more provides a fiber-reinforced composite material with improved compression strength and high heat resistance.

Specific examples of tetraglycidyl diaminodiphenylmethane that can be used include "Sumiepoxy (registered trademark)" ELM434 (Sumitomo Chemical Co., Ltd.), YH434L (Tohto Kasei Co., Ltd.), "Araldite (registered trademark)" MY720 (Huntsman Advanced Materials), and "jER (registered trademark)" 604 (Japan Epoxy Resins Co., Ltd). Specific examples of triglycidyl aminophenol and triglycidyl aminocresol that can be used include "Sumiepoxy (registered trademark)" ELM100 (Sumitomo Chemical Co., Ltd.), "Araldite (registered trademark)" MY0510, "Araldite (registered trademark)" MY0600 (Huntsman Advanced Materials), and "jER (registered trademark)" 630 (Japan Epoxy Resins Co., Ltd).

The aromatic diamine curing agent may be any aromatic amine that can be used as a curing agent of an epoxy resin composition. Specifically, 3,3'-diaminodiphenylsulfone (3,3'-DDS), 4,4'-diaminodiphenylsulfone (4,4'-DDS), diaminodiphenylmethane (DDM), diaminodiphenyl ether (DADPE), bisaniline, benzyl dimethylaniline, 2-(dimethylaminomethyl)phenol (DMP-10), 2,4,6-tris(dimethylaminomethyl)phenol (DMP-30), tri-2-ethylhexylic acid salts of DMP-30, and isomers and derivatives thereof are suitable for use. These may be used alone or as a mixture of two or more.

Examples of commercially available products of aromatic amine curing agents include SEIKACURE S (Wakayama Seika Kogyo Co., Ltd.), MDA-220 (Mitsui Chemicals, Inc.), "jERCURE (registered trademark)" W (Japan Epoxy Resins Co., Ltd.), 3,3'-DAS (Mitsui Chemicals, Inc.), "Lonzacure (registered trademark)" M-DEA (Lonza), "Lonzacure (registered trademark)" M-DIPA (Lonza), "Lonzacure (registered trademark)" M-MIPA (Lonza), and "Lonzacure (registered trademark)" DETDA 80 (Lonza).

The aromatic diamine curing agent as described above is preferably contained in a stoichiometric amount of 50% to 120% by mass, more preferably 60% to 120% by mass, and still more preferably 70% to 90% by mass, relative to the total epoxy compounds in an epoxy resin composition. An aromatic amine curing agent in a stoichiometric amount of 50% by mass or more relative to the total epoxy compounds provides a cured resin product with high heat resistance. An aromatic amine curing agent in an amount of 120% by mass or less provides a cured resin product with improved toughness.

To accelerate the curing of an epoxy resin composition, effect accelerators may be added. Examples of curing accelerators include urea compounds, tertiary amines and salts thereof, imidazoles and salts thereof, triphenylphosphine and derivatives thereof, metal carboxylates, and Lewis acids, Brönsted acids, and salts thereof.

To provide a cured resin product with improved physical properties, such as toughness, the matrix resin of the fiber-reinforced composite material may include a thermoplastic resin. Examples of the thermoplastic resin that can be used include thermoplastic resins having, in its main chain, a bond selected from the group consisting of carbon-carbon bond, amide bond, imide bond (e.g., polyetherimide), ester bond, ether bond, siloxane bond, carbonate bond, urethane bond, urea bond, thioether bond, sulfone bond, imidazole bond, and carbonyl bond. For example, thermoplastic resins having both heat resistance and toughness, such as polysulfones, polyethersulfones, polyetherimides, polyimides, polyamides, polyamide-imides, polyphenylene ethers, phenoxy resins, and vinyl polymers, are suitable for use.

In particular, polyethersulfones and polyetherimides, which can produce the above effect with little or no decrease in heat resistance, are suitable. Examples of polyethersulfones include "SUMIKAEXCEL (registered trademark)" 3600P, "SUMIKAEXCEL (registered trademark)" 5003P, "SUMIKAEXCEL (registered trademark)" 5200P, and "SUMIKAEXCEL (registered trademark)" 7200P (all available from Sumitomo Chemical Co., Ltd.). Examples of polyetherimides include "Ultem (registered trademark)" 1000, "Ultem (registered trademark)" 1010, and "Ultem (registered trademark)" 1040 (all available from GE Plastics Japan).

The amount of the thermoplastic resin as described above, when dissolved in an epoxy resin composition, is preferably 1 to 40 parts by mass, more preferably 1 to 25 parts by mass, based on 100 parts by mass of the epoxy compound. When the thermoplastic resin is dispersed in the epoxy resin composition, the amount of the thermoplastic resin is preferably 10 to 40 parts by mass, more preferably 15 to 30 parts by mass, based on 100 parts by mass of the epoxy compound. A thermoplastic resin in an amount in this range produces a higher toughness-improving effect. A thermoplastic resin in an amount not exceeding this range provides high impregnation properties, tackiness, drape, and heat resistance.

Preferably, the thermoplastic resin as described above is uniformly dissolved or finely dispersed in the form of particles in the epoxy resin composition so as not to interfere with a manufacturing process for a prepreg, particularly, in terms of impregnation properties.

To modify the matrix resin, thermosetting resins other than the thermosetting resin used as the matrix resin, elastomers, fillers, rubber particles, thermoplastic resin particles, inorganic particles, and other additives may be further added.

The thermoplastic resin particles may be particles of the same thermoplastic resins as listed above. In particular, polyamide particles and polyimide particles are suitable for use. Among polyamides, nylon 12, nylon 6, nylon 11, and nylon 6/12 copolymer are preferred because they can provide particularly high adhesion to thermosetting resins and thus provide a fiber-reinforced composite material having a high interlaminar peel strength against falling weight impacts, i.e., a highly improved shock resistance. Furthermore, particles modified with a combination of a polyamide resin and an epoxy resin to have a semi-IPN (interpenetrating polymer network) structure, as disclosed in JP 01-104624 A, are more preferred because the particles have high heat resistance and solvent resistance. One specific example is "Toraypearl (registered trademark)" TN available from Toray Industries, Inc.

Although the shape of the thermoplastic resin particles may be spherical, nonspherical, or porous, spherical particles are preferred in that they cause no reduction in flow properties of the resin and thus provide excellent viscoelasticity and in that they provide high impact resistance due to a lack of starting points of stress concentration.

As the rubber particles, cross-linked rubber particles and core-shell rubber particles obtained by grafting a dissimilar polymer onto the surface of cross-linked rubber particles are suitable for use in terms of handleability and other properties.

To control the flowability of the matrix resin, for example, by thickening the resin, inorganic particles such as silica, alumina, smectite, and synthetic mica can be further added to the matrix resin to the extent that the effects of the present invention are not adversely affected.

The prepreg can be produced, for example, by a wet method in which the above-described matrix resin is dissolved in a solvent such as methyl ethyl ketone or methanol to reduce its viscosity, and reinforcing fibers are impregnated with the resulting solution, or a hot melt method (dry method) in which the matrix resin is heated to reduce its viscosity, and reinforcing fibers are impregnated with the resulting solution.

In the wet method, reinforcing fibers are immersed in a matrix resin solution and then pulled up, and the solvent is evaporated using an oven or the like. In the hot melt method, reinforcing fibers are directly impregnated with a matrix resin whose viscosity has been reduced by heating; alternatively, a matrix resin is applied onto a sheet of release paper or the like to prepare a coated film, the film is then laminated on one or both sides of reinforcing fibers, and the laminate is hot-pressed to impregnate the reinforcing fibers with the matrix resin. The hot melt method is preferred because substantially no solvent remains in the prepreg.

After the prepregs obtained are laminated, the matrix resin is cured by heating while the laminate is pressurized. In such a manner, a fiber-reinforced composite material can be produced. Heat and pressure can be applied, for example, by press forming, autoclave molding, bag molding, wrapping tape molding, internal pressure molding, or vacuum-pressure molding. The fiber-reinforced composite material can also be produced not via prepregs but using a molding method such as filament winding, hand lay-up, resin injection molding, "SCRIMP (registered trademark)", resin film infusion, or resin transfer molding.

The fiber-reinforced composite material of the present invention can be used, for example, for housings, internal members (e.g., trays and chassis), and cases of the internal members of electrical and electric devices such as personal computers, displays, office automation devices, cellular phones, personal digital assistants, facsimiles, compact discs, portable MDs, portable radio cassette players, PDAs (personal digital assistants such as electronic organizers), video cameras, digital still cameras, optical instruments, audio instruments, air-conditioners, lighting instruments, leisure products, toy products, and other household electrical appliances; construction materials such as mechanism components and panels; automobile and two-wheeled vehicle-related components such as motor components, alternator terminals, alternator connectors, IC regulators, potentiometer bases for light dimmers, suspension components, various valves such as exhaust gas valves, various pipes for fuels, exhaust systems, and air intake systems, air intake nozzle snorkels, intake manifolds, various arms, various frames, various hinges, various bearings, fuel pumps, gasoline tanks, CNG tanks, engine coolant joints, carburetor main bodies, carburetor spacers, exhaust gas sensors, coolant sensors, oil temperature sensors, brake pad wear sensors, throttle position sensors, crankshaft position sensors, air flow meters, brake pad wear sensors, thermostat bases for air-conditioners, warming hot air flow control valves, brush holders for radiator motors, water pump impellers, turbine vanes, windshield wiper motor-related components, distributors, starter switches, starter relays, transmission wire harnesses, window washer nozzles, air-conditioner panel switch boards, coils for fuel solenoid valves, fuse connectors, battery trays, AT brackets, headlamp supports, pedal housings, steering wheels, door beams, protectors, chassis, frames, armrests, horn terminals, step motor rotors, lamp sockets, lamp reflectors, lamp housings, brake pistons, noise shields, radiator supports, spare tire covers, seat shells, solenoid bobbins, engine oil filters, ignition cases, underside covers, scuff plates, pillar trims, propeller shafts, wheels, fenders, fascias, bumpers, bumper beams, hoods, aerodynamic components, platforms, cowl louvers, roofs, instrument panels, spoilers, and various modules; members, outer plates, and aircraft-related components such as landing gear pods, winglets, spoilers, edges, rudders, elevators, fairings, and ribs; and outer plates and windmill blades. In particular, the fiber-reinforced composite material is suitable for use for aircraft members, windmill blades, automobile outer plates, and housings, trays, and chassis of electric devices.

EXAMPLES

The present invention will now be described in more detail with reference to examples, but these examples are not intended to limit the present invention.

Materials and components used as sizing agent components in Examples and Comparative Example are as described below.
Compound Having at Least One Epoxy Group: (A-1 to A-3)
 (A-1) "Denacol (registered trademark)" EX-521 (Nagase ChemteX Corporation: polyglycerol polyglycidyl ether)
 (A-2) "Denacol (registered trademark)" EX-411 (Nagase ChemteX Corporation: pentaerythritol polyglycidyl ether)
 (A-3) "Denacol (registered trademark)" EX-611 (Nagase ChemteX Corporation: sorbitol polyglycidyl ether)
Polyrotaxane: (B-1 to B-3)
 (B-1) "SeRM (registered trademark)" Super Polymer SH2400P (Advanced Softmaterials Inc., cyclic molecule: α-cyclodextrin, linear molecule: polyethylene glycol having a weight average molecular weight of 20,000, stopper group: adamantane group, cyclic molecules are modified with graft chains of poly(ε-caprolactone))
 (B-2) "SeRM (registered trademark)" Super Polymer SH1310P (Advanced Softmaterials Inc., cyclic molecule: α-cyclodextrin, linear molecule: polyethylene glycol having a weight average molecular weight of 11,000, stopper group: adamantane group, cyclic molecules are modified with graft chains of poly(ε-caprolactone))
 (B-3) "SeRM (registered trademark)" Super Polymer SH3400P (Advanced Softmaterials Inc., cyclic molecule: α-cyclodextrin, linear molecule: polyethylene glycol having a weight average molecular weight of 35,000, stopper group: adamantane group, cyclic molecules are modified with graft chains of poly(ε-caprolactone))

Example 1

In this example, carbon fibers were used as reinforcing fibers. This example involves a first step, a second step, and a third step described below.
First Step: Step of Producing Carbon Fibers
 A copolymer made of 99 mol % of acrylonitrile and 1 mol % of itaconic acid was spun and then fired to give carbon fibers having a total number of filaments of 12,000, a specific gravity of 1.8, a strand tensile strength of 700 kgf/mm$^2$, and a strand tensile modulus of 33,000 kgf/mm$^2$. The carbon fibers were then subjected to a liquid-phase electrolytic oxidation treatment using an aqueous ammonium hydrogen carbonate solution at a concentration of 0.1 mol/L as an electrolyte solution. The carbon fibers that have been subjected to the liquid-phase electrolytic oxidation treatment were then washed with water and dried in hot air at a temperature of 150° C. to provide surface-oxidized carbon fibers.
Second Step: Step of Fabricating Sizing-Coated Carbon Fibers and Evaluations
 Seventy parts by mass of the compound having at least one epoxy group (A-1) and 30 parts by mass of the polyrotaxane (B-1) were dissolved in a dimethylformamide solvent to prepare a sizing agent solution. The sizing agent solution was applied to the above-obtained surface-oxidized carbon fibers using a dipping method and then heat treated at a temperature of 210° C. for 180 seconds to give a sizing agent-coated carbon fiber bundle. The amount of adhered sizing agent was determined by the following method. The amount of adhered sizing agent was controlled to be 0.5 parts by mass based on 100 parts by mass of the sizing agent-coated carbon fibers.
Measurement of Amount of Adhered Sizing Agent
 About 2 g of a sizing agent-coated carbon fiber bundle was weighed (W1) (to the fourth decimal place), placed in an electric furnace (capacity: 120 cm$^3$) set at a temperature of 450° C., and allowed to stand for 15 minutes under a nitrogen stream of 50 mL/min to completely pyrolyze the sizing agent. The resulting carbon fiber bundle was then transferred into a container under a dry nitrogen stream of 20 L/min, cooled for 15 minutes, and then weighed (W2) (to the fourth decimal place). The amount of adhered sizing agent based on 100 parts by mass of the sizing agent-coated carbon fiber bundle was calculated by the following equation.

$$\text{Amount of adhered sizing agent (parts by mass)} = [W1\,(g) - W2\,(g)]/[W1\,(g)] \times 100$$

In this example, the average value of two measurements was used as an amount of adhered sizing agent.
 After that, the interfacial shear strength (IFSS) of the sizing agent-coated carbon fibers was determined by the following method. The IFSS was 42 MPa, showing that the sizing agent-coated carbon fibers had sufficiently high adhesion.

Measurement of Interfacial Shear Strength (IFSS)

The interfacial shear strength (IFSS) was determined by the following procedure (a) to (d).

(a) Preparation of Resin

Into a container, 100 parts by mass of a bisphenol A epoxy resin compound "jER" (registered trademark) 828 (Mitsubishi Chemical Corporation) and 14.5 parts by mass of m-phenylenediamine (Sigma-Aldrich Japan) were placed. After that, to reduce the viscosity of jER828 and to dissolve m-phenylenediamine, the container was heated at a temperature of 75° C. for 15 minutes. The two compounds were then mixed well and degassed in vacuo at a temperature of 80° C. for about 15 minutes.

(b) Fixation of Single Carbon Fiber to Dedicated Mold

From the carbon fiber bundle, a single fiber was drawn out. Using an adhesive, the single fiber was fixed under a certain tension to a dumbbell-shaped mold with two ends of the single fiber attached to longitudinal ends of the mold. After that, to remove the water on the carbon fibers and the mold, vacuum drying was carried out at a temperature of 80° C. for 30 minutes or longer. The dumbbell-shaped mold is made of silicone rubber and has a casting part with a central width of 5 mm, a length of 25 mm, an end width of 10 mm, and a total length of 150 mm.

(c) Casting and Curing of Resin

Into the dumbbell-shaped mold vacuum dried in the step (b), the resin prepared in the step (a) was cast. Using an oven, the temperature was raised to a temperature of 75° C. at a rate of 1.5° C./min and held at 75° C. for 2 hours. After that, the temperature was raised to a temperature of 125° C. at a rate of 1.5 minutes, held at 125° C. for 2 hours, and then lowered to a temperature of 30° C. at a rate of 2.5° C./min. The resin was then removed from the mold to give a test piece.

(d) Measurement of Interfacial Shear Strength (IFSS)

To the test piece obtained in the step (c), a tensile force was applied in the fiber axis direction (the longitudinal direction) to cause a 12% strain, and then the number N of fiber breakages in a 22 mm central part of the test piece was counted using a polarizing microscope. Next, an average length of broken fibers la was calculated by the equation: la (µm)=22×1,000 (µm)/M, and using the average length of broken fibers la, a critical fiber length lc was calculated by the equation: lc (0.1 m)=(4/3)×la (µm). A strand tensile strength σ and a diameter d of the single carbon fiber were measured, and an interfacial shear strength IFSS was calculated by the following equation. In Examples, the test result was the average of five measurements.

Interfacial shear strength IFSS (MPa)=σ(MPa)×d (µm)/(2×lc)(µm)

The strand tensile strength was determined by the following procedure in accordance with the testing method for resin-impregnated strands of JIS-R-7608 (2004). The resin used for impregnation was "CELLOXIDE" (registered trademark) 2021P (Daicel Chemical Industries, Ltd.)/boron trifluoride monoethylamine (Tokyo Chemical Industry Co., Ltd.)/acetone=100/3/4 (parts by mass). The curing conditions of the resin were at normal pressure and 125° C. for 30 minutes. The average value of measurements of ten strands of the carbon fiber bundles was used as the strand tensile strength.

The interfacial shear strength IFSS indicates an adhesive strength at an interface between carbon fibers and a matrix resin. In the present invention, the interfacial shear strength is preferably in the range of 30 MPa or more.

Third Step: Fabrication of Prepreg, Molding of Stacked Carbon Fiber-Reinforced Composite Material, and Evaluations Fabrication of Prepreg First, 60 parts by mass of a bisphenol A epoxy resin, "jER (registered trademark)" 828 (Mitsubishi Chemical Corporation), 40 parts by mass of tetraglycidyl diaminodiphenylmethane, ELM434 (Sumitomo Chemical Co., Ltd.), 40 parts by mass of 4,4'-diaminodiphenylsulfone, "SEIKACURE (registered trademark)" S (Wakayama Seika Kogyo Co., Ltd.), and 10 parts by mass of polyethersulfone "SUMIKAEXCEL (registered trademark)" PES5003P (Sumitomo Chemical Co., Ltd.) were mixed to prepare an epoxy resin composition. This epoxy resin composition was applied onto a sheet of release paper at a resin weight of 30 g/m² with a knife coater to obtain a primary resin film. The primary resin film was superposed on both sides of unidirectionally aligned sizing agent-coated carbon fibers (weight: 190 g/m²), and using a heated roll, heat and pressure was applied to impregnate the sizing agent-coated carbon fibers with the epoxy resin composition, thereby fabricating a primary prepreg. Next, the epoxy resin composition was further mixed with 80 parts by mass of "Toraypearl (registered trademark)" TN (Toray Industries, Inc., average particle size: 13.0 µm) to prepare a resin composition. This resin composition was applied onto a sheet of release paper at a resin weight of 20 g/m² with a knife coater to obtain a secondary resin film. The secondary resin film was superposed on both sides of the primary prepreg to impregnate the primary prepreg with the resin composition to fabricate a desired prepreg.

Molding of Carbon Fiber-Reinforced Composite Material and Measurement of Mode I Interlaminar Fracture Toughness ($G_{Ic}$)

The prepreg fabricated as described above was cut into pieces. The pieces were unidirectionally stacked and then cured by heating in an autoclave to obtain a unidirectionally reinforced material (carbon fiber-reinforced composite material). In accordance with the double cantilever beam test described in JIS K7086 (1993), the Mode I interlaminar fracture toughness ($G_{Ic}$) at an early stage of crack growth was determined to be sufficiently high. The results are shown in Table 1.

Higher Mode I interlaminar fracture toughnesses ($G_{Ic}$) indicate better adhesions between carbon fibers and a matrix resin and higher toughnesses of fiber-reinforced composite materials. In the present invention, the Mode I interlaminar fracture toughness ($G_{Ic}$) is preferably in the range of 700 J/m² or more. In Table 1, Mode I interlaminar fracture toughnesses ($G_{Ic}$) of 950 J/m² or more are denoted by A, 700 J/m² to less than 950 J/m² by B, and less than 700 J/m² by C.

TABLE 1

| | | | Example 1 | Example 2 | Example 3 | Example 4 | Example 5 | Example 6 | Example 7 | Example 8 | Example 9 | Example 10 | Comparative Example 1 |
|---|---|---|---|---|---|---|---|---|---|---|---|---|---|
| Sizing agent [% by mass] | Epoxy compound | (A-1) EX-521 | 70 | | | 35 | 70 | 70 | 90 | 50 | 10 | 70 | |
| | | (A-2) EX-411 | | 70 | | 35 | | | | | | | 100 |
| | | (A-3) EX-611 | | | 70 | | | | | | | | |
| | Polyrotaxane | (B-1) SH2400P | 30 | 30 | 30 | 30 | | | 10 | 50 | 90 | 30 | |
| | | (B-2) SH1310P | | | | | 30 | | | | | | |
| | | (B-3) SH3400P | | | | | | 30 | | | | | |
| Evaluation Items | Amount of adhered sizing agent [parts by mass] | | 0.5 | 0.5 | 0.5 | 0.5 | 0.5 | 0.5 | 0.5 | 0.5 | 0.5 | 1 | 0.5 |
| | Interfacial shear strength (IFSS) [MPa] | | 40 | 39 | 33 | 40 | 40 | 37 | 42 | 44 | 32 | 41 | 41 |
| | Mode I interlaminar fracture toughness ($G_{Ic}$) | | A | A | A | A | B | B | B | A | A | A | C |

Examples 2 to 9

First Step: Step of Producing Carbon Fibers to be Used as Raw Material

The same procedure as in Example 1 was repeated.

Second Step: Step of Fabricating Sizing-Coated Carbon Fibers and Evaluations

Sizing agent-coated carbon fibers were obtained in the same manner as in Example 1 except that composition ratios were as shown in Table 1. Using the sizing agent-coated carbon fibers obtained, interfacial shear strengths (IFSS) were determined in the same manner as in Example 1, demonstrating that the sizing agent-coated carbon fibers had sufficiently high adhesion. The results are shown in Table 1.

Third Step: Fabrication of Prepreg, Molding of Stacked Carbon Fiber-Reinforced Composite Material, and Evaluations Unidirectionally reinforced materials (carbon fiber-reinforced composite materials) were obtained in the same manner as in Example 1 and evaluated for mechanical properties, and Mode I interlaminar fracture toughnesses (GO were sufficiently high. The results are shown in Table 1.

Example 10

First Step: Step of Producing Carbon Fibers

The same procedure as in Example 1 was repeated.

Second Step: Step of Fabricating Sizing-Coated Carbon Fibers and Evaluations

Sizing agent-coated carbon fibers were obtained in the same manner as in Example 1 except that the sizing agent solution concentration was adjusted so that the amount of adhered sizing agent was 1 part by mass based on 100 parts by mass of the sizing agent-coated carbon fibers. Using the sizing agent-coated carbon fibers obtained, an interfacial shear strength (IFSS) was determined in the same manner as in Example 1, demonstrating that the sizing agent-coated carbon fibers had sufficiently high adhesion. The results are shown in Table 1.

Third Step: Fabrication of Prepreg, Molding of Stacked Carbon Fiber-Reinforced Composite Material, and Evaluations A unidirectionally reinforced material (carbon fiber-reinforced composite material) was obtained in the same manner as in Example 1 and evaluated for mechanical properties, and a Mode I interlaminar fracture toughness ($G_{Ic}$) was sufficiently high. The results are shown in Table 1.

Comparative Example 1

First Step: Step of Producing Carbon Fibers

The same procedure as in Example 1 was repeated.

Second Step: Step of Fabricating Sizing-Coated Carbon Fibers and Evaluations

Sizing agent-coated carbon fibers were obtained in the same manner as in Example 1 except that the component (A-2) alone was used to prepare a sizing agent solution. Using the sizing agent-coated carbon fibers obtained, an interfacial shear strength (IFSS) was determined in the same manner as in Example 1, demonstrating that the sizing agent-coated carbon fibers had sufficiently high adhesion. The results are shown in Table 1.

Third Step: Fabrication of Prepreg, Molding of Stacked Carbon Fiber-Reinforced Composite Material, and Evaluations A unidirectionally reinforced material (carbon fiber-reinforced composite material) was obtained in the same manner as in Example 1 and evaluated for mechanical properties, and a Mode I interlaminar fracture toughness ($G_{Ic}$) was low. The results are shown in Table 1.

The invention claimed is:

1. Sizing agent-coated reinforcing fibers comprising:
   reinforcing carbon fibers; and
   a sizing agent comprising a polyrotaxane component and an epoxy compound component,
wherein
   the polyrotaxane component comprises cyclodextrin and polyethylene glycol, and the epoxy compound component is a glycidyl ether epoxy compound produced by a reaction between epichlorohydrin and at least one compound selected from glycerol, diglycerol, polyglycerol, trimethylolpropane, pentaerythritol, sorbitol, and arabitol; and wherein the reinforcing fibers are coated with the sizing agent.

2. The sizing agent-coated reinforcing fibers according to claim 1, wherein the sizing agent comprises the polyrotaxane component in an amount of 5% to 80% by mass based on a total amount of sizing agent.

3. The sizing agent-coated reinforcing fibers according to claim 1, wherein the polyrotaxane component comprises a linear molecule having a weight average molecular weight of 15,000 to 30,000.

4. The sizing agent-coated reinforcing fibers according to claim 1, wherein the cyclodextrin is modified with a polymer chain, and the polymer chain comprises a bond selected from —O— bond and —NH— bond and a group selected from alkylene and alkenylene.

5. A method for producing the sizing agent-coated reinforcing fibers according to claim 1, the method comprising, in sequence:

applying the sizing agent to the reinforcing carbon fibers; and heat-treating the reinforcing carbon fibers, wherein in the step of applying the sizing agent, the sizing agent is adhered in an amount of 0.1 to 10 parts by mass based on 100 parts by mass of the sizing agent-coated reinforcing fibers, and the step of heat-treating the reinforcing carbon fibers is carried out at a temperature in a range of 160° C. to 260° C. for 30 to 600 seconds.

6. A prepreg comprising:
the sizing agent-coated reinforcing fibers according to claim 1; and
a thermosetting resin.

7. The prepreg according to claim 6, wherein the thermosetting resin is an epoxy resin.

8. A fiber-reinforced composite material obtained by curing the prepreg according to claim 6.

9. A fiber-reinforced composite material comprising:
the sizing agent-coated reinforcing fibers according to claim 1; and
a cured product of a thermosetting resin.

10. The fiber-reinforced composite material according to claim 9, wherein the thermosetting resin is an epoxy resin.

* * * * *